United States Patent
Bailly

(10) Patent No.: US 11,040,768 B2
(45) Date of Patent: Jun. 22, 2021

(54) METHOD AND A DEVICE FOR MOVING THE CENTER OF GRAVITY OF AN AIRCRAFT

(71) Applicant: AIRBUS HELICOPTERS, Marignane (FR)

(72) Inventor: Stephane Bailly, Cabries (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 16/821,194

(22) Filed: Mar. 17, 2020

(65) Prior Publication Data
US 2020/0298962 A1    Sep. 24, 2020

(30) Foreign Application Priority Data
Mar. 18, 2019   (FR) ...................................... 1902752

(51) Int. Cl.
*B64C 17/02*    (2006.01)
*B64C 27/32*    (2006.01)

(52) U.S. Cl.
CPC .............. *B64C 17/02* (2013.01); *B64C 27/32* (2013.01)

(58) Field of Classification Search
CPC ... B64C 17/02; B64C 17/04; B64C 2201/108; B64C 2201/14; B64C 27/32; B64C 39/024; G01M 1/127; G06G 7/70
See application file for complete search history.

(56) References Cited

U.S. PATENT DOCUMENTS

| 3,656,723 | A | * | 4/1972 | Piasecki | B64C 37/02 244/2 |
| 3,985,320 | A | * | 10/1976 | Brady | B64C 17/06 244/93 |
| 5,115,996 | A | * | 5/1992 | Moller | B64C 29/0025 239/265.19 |
| 6,119,976 | A | * | 9/2000 | Rogers | B64C 39/024 244/13 |
| 6,406,409 | B1 | * | 6/2002 | Silver | A63B 71/0036 482/104 |

(Continued)

FOREIGN PATENT DOCUMENTS

| CN | 106218877 A | 12/2016 |
| CN | 207725615 U | 8/2018 |

(Continued)

OTHER PUBLICATIONS

French Search Report for French Application No. FR 1902752, Completed by the French Patent Office, dated Dec. 10, 2019, 9 pages.

*Primary Examiner* — Medhat Badawi
(74) *Attorney, Agent, or Firm* — Brooks Kushman P.C.

(57) ABSTRACT

An adjustment device for adjusting the position of the center of gravity of an aircraft, the aircraft having at least two thrust production units that contribute at least to providing the aircraft with lift, the adjustment device comprising at least one heavy member that is movable relative to an airframe of the aircraft and also at least one actuator for causing the heavy member to move. The adjustment device includes an avionics system configured to detect a failure of any one of the thrust production units and, in the presence of such a failure, to control the at least one actuator to cause the heavy member to move.

15 Claims, 6 Drawing Sheets

(56) References Cited

U.S. PATENT DOCUMENTS

| | | | |
|---|---|---|---|
| 6,533,220 B2* | 3/2003 | Schuster | B64D 1/22 244/118.1 |
| 6,742,741 B1* | 6/2004 | Rivoli | B64C 39/024 244/12.1 |
| 6,913,228 B2* | 7/2005 | Lee | B64C 17/10 244/135 C |
| 6,923,404 B1* | 8/2005 | Liu | B64C 5/12 244/46 |
| 7,185,848 B2* | 3/2007 | Heaven, Jr. | B64B 1/70 244/93 |
| 7,364,114 B2* | 4/2008 | Wobben | B64C 27/20 244/12.3 |
| 8,000,849 B2* | 8/2011 | Reich | B64C 13/20 701/14 |
| 8,109,802 B2* | 2/2012 | Chui | A63H 27/12 446/36 |
| 8,205,822 B1* | 6/2012 | Jameson | B64C 39/024 244/17.11 |
| 8,226,040 B2* | 7/2012 | Neto | G01M 1/127 244/135 C |
| 8,292,215 B2* | 10/2012 | Olm | B64C 39/024 244/17.23 |
| 8,353,199 B1* | 1/2013 | Ma | A63H 27/12 73/65.05 |
| 8,622,336 B2* | 1/2014 | Brenner | G05D 1/0858 244/17.13 |
| 8,648,509 B2* | 2/2014 | Bastian, II | B64C 27/20 310/74 |
| 8,721,383 B2* | 5/2014 | Woodworth | B64C 29/0033 446/6 |
| 9,061,763 B1* | 6/2015 | Christensen | B64C 27/32 |
| 9,205,922 B1* | 12/2015 | Bouwer | B66C 13/00 |
| 9,415,870 B1* | 8/2016 | Beckman | B64C 39/024 |
| 9,422,055 B1* | 8/2016 | Beckman | B64C 39/024 |
| 9,550,561 B1* | 1/2017 | Beckman | B64C 17/00 |
| 9,598,171 B2* | 3/2017 | Olm | B64C 25/36 |
| 9,704,409 B2* | 7/2017 | Prakash | B64C 39/024 |
| 9,738,380 B2* | 8/2017 | Claridge | B64C 39/024 |
| 9,908,619 B1 | 3/2018 | Beckman et al. | |
| 10,543,905 B1* | 1/2020 | Kwon | B64D 27/24 |
| 10,822,082 B2* | 11/2020 | Hanna | H02J 7/007 |
| 10,882,615 B2* | 1/2021 | Bhat | B64C 17/00 |
| 10,960,984 B2* | 3/2021 | Moxon | B64C 17/00 |
| 2001/0028018 A1* | 10/2001 | Darbyshire | B64C 17/02 244/93 |
| 2002/0175243 A1* | 11/2002 | Black | B64B 1/38 244/97 |
| 2006/0226281 A1* | 10/2006 | Walton | B64C 29/0033 244/17.23 |
| 2007/0215750 A1* | 9/2007 | Shantz | A63H 30/04 244/17.23 |
| 2008/0099079 A1* | 5/2008 | Johnson | B64C 17/10 137/386 |
| 2009/0134273 A1* | 5/2009 | Page | B64C 39/024 244/63 |
| 2009/0283629 A1* | 11/2009 | Kroetsch | A63H 27/12 244/17.23 |
| 2009/0299551 A1* | 12/2009 | So | B64C 39/024 701/3 |
| 2010/0278656 A1* | 11/2010 | Taya | F04D 29/324 416/241 A |
| 2011/0139928 A1* | 6/2011 | Morris | G05D 1/102 244/1 TD |
| 2011/0158809 A1* | 6/2011 | Luo | A63H 27/12 416/112 |
| 2014/0263827 A1* | 9/2014 | Smith | B64B 1/42 244/96 |
| 2014/0339371 A1* | 11/2014 | Yates | B64D 27/24 244/53 R |
| 2016/0031564 A1* | 2/2016 | Yates | B64D 33/00 307/9.1 |
| 2016/0196755 A1* | 7/2016 | Navot | G08G 5/0086 701/4 |
| 2016/0244157 A1* | 8/2016 | Welsh | B64C 27/52 |
| 2016/0264234 A1 | 9/2016 | Vaughn et al. | |
| 2016/0340028 A1* | 11/2016 | Datta | B64C 15/12 |
| 2016/0376014 A1* | 12/2016 | Alnafisah | B64C 39/024 244/39 |
| 2017/0137098 A1* | 5/2017 | Valsvik | G01V 1/3852 |
| 2017/0320568 A1* | 11/2017 | Hohenthal | B64D 27/24 |
| 2018/0141647 A1* | 5/2018 | Suzuki | B64C 17/02 |
| 2018/0222560 A1* | 8/2018 | Postic | B63G 8/001 |
| 2018/0227469 A1* | 8/2018 | Osanai | G02B 27/644 |

FOREIGN PATENT DOCUMENTS

| | | |
|---|---|---|
| EP | 3594113 A1 | 1/2020 |
| KR | 101800662 B1 | 11/2017 |

* cited by examiner

METHOD AND A DEVICE FOR MOVING THE CENTER OF GRAVITY OF AN AIRCRAFT

CROSS-REFERENCE TO RELATED APPLICATIONS

This application claims priority to French patent application No. FR 19 02752 filed on Mar. 18, 2019, the disclosure of which is incorporated in its entirety by reference herein.

BACKGROUND OF THE INVENTION

(1) Field of the Invention

The present invention relates to a method and to a device for moving the center of gravity of an aircraft, and it also relates to an aircraft applying the method. For example, the aircraft may be a drone, i.e. an aircraft without a human pilot on board, which aircraft might carry goods and/or passengers.

(2) Description of Related Art

An aircraft may comprise an airframe and a plurality of thrust production units, each contributing to providing the aircraft with lift, and possibly also with propulsion. For example, each thrust production unit may be carried by a body of the airframe via a fastener structure. Each thrust production unit may comprise at least one rotor and at least one motor, each rotor having blades that are rotated by the motor. For example, each thrust production unit may comprise one or more thrust production systems. Thus, by way of example, each thrust production unit may comprise two rotors that are rotated respectively by two dedicated motors. For convenience, the term "rotor system" is used to designate a system comprising a rotor having blades and a motor, where a motor may be dedicated to a single rotor assembly or may be common to a plurality of rotor assemblies.

An aircraft may have at least two thrust production units, and by way of example it may have four thrust production units arranged substantially at four corners of a quadrilateral.

The aircraft is controlled by controlling each thrust production unit. On a multirotor aircraft having thrust production units with rotors, this control can be obtained by controlling the speed of rotation of the rotors and/or the pitch of the rotor blades, while the direction of rotation of the rotors may be constant.

In the event of a failure of a thrust production unit, the aircraft can become unbalanced. The risk of unbalance increases with decreasing number of thrust production units.

Document US 2018/141647 describes a four-rotor aircraft. That aircraft comprises an entity having four arms, each carrying a respective one of the four rotors. The aircraft also has a rod carrying a first assembly and possibly also a second assembly, which assemblies are situated on opposite sides of said entity along a direction. Said entity is movable relative to the first assembly, and also to the second assembly, if present.

Document US 2016/264234 describes a method and a device for balancing an aircraft by adjusting the position of its center of gravity.

Document CN 207 725 615 is a utility model relating to a drone. That drone has arms carrying rotors. An arm may include a linear motor connected to a balancing weight.

Document CN 106 218 877 relates to a multirotor drone that is fuel-driven and that is provided with an attitude adjusting and changing device.

Documents U.S. Pat. No. 9,908,619 and KR 101 800 662 are also known.

BRIEF SUMMARY OF THE INVENTION

An object of the present invention is thus to propose a device seeking at least to limit the risks of an accident as a result of unbalance, in particular following a failure of a thrust production unit.

The invention provides an adjustment device for adjusting the position of the center of gravity of an aircraft, the aircraft including at least two thrust production units, or indeed at least three or four thrust production units, each of which contributes at least to providing the aircraft with lift, and possibly also with propulsion. The adjustment device comprises at least one heavy member that is movable relative to an airframe of the aircraft, the adjustment device comprising at least one actuator for causing said heavy member to move.

The adjustment device includes an avionics system configured to detect a failure of any one of the thrust production units and, in the presence of a failure of at least one thrust production unit, to control said at least one actuator for causing said heavy member to move.

By way of non-exclusive example, the aircraft may be a drone.

The term "avionics system" designates a system comprising in particular one or more on-board calculation means and possibly also various sensors. The avionics system may comprise one or more calculation means, and by way of example calculation means of the type usually present on an aircraft. The avionics system may comprise flight control calculation means serving in particular to prepare setpoints for following a path, and/or regulation calculation means controlling motors to follow setpoints that have been issued, and/or monitoring calculation means that monitor the operation of the aircraft, and/or calculation means dedicated to applying the invention. For safety reasons, at least some of the calculation means may be provided in redundant manner. Several of the above-mentioned calculation means may be combined in single calculation means.

Each thrust production unit may comprise one or more thrust production systems, and for example it may comprise one or more rotor systems.

Under such circumstances, the regulation device includes a member or a set of members referred to, for convenience, as the "avionics system", and capable of estimating in conventional manner whether a thrust production unit has failed. Such a failure may be a failure that has an influence on the thrust generated by at least one thrust production system of the thrust production unit that is considered to have failed, and its thrust might even become zero in untimely manner. Such a failure could be referred to as a "partial or total failure of thrust", but is referred to more simply merely as a "failure".

If a thrust production unit is deemed to have failed, the avionics system controls at least one actuator to move at least one heavy member in order to change the position of the center of gravity of the aircraft.

Specifically, such a failure of a thrust production unit can change the attitude of the aircraft or can lead to losing control of the aircraft in the event of a total failure of the thrust production unit. In order to remedy that, and to make the aircraft easier to pilot, the position of the center of gravity is modified without human intervention so as to be adapted to the new thrust configuration of the aircraft, and/or so as to anticipate worsening of the failure that might lead to a new thrust configuration.

The aircraft is easier to control so long as the center of gravity of the aircraft lies substantially within a first acceptable zone defined by the thrust production units, and in particular so long as it is present in a first polygon if there are three or more thrust production units, with the corners of the first polygon being located at the thrust production units. In the presence of a failure in which a thrust production unit is inoperative, the first zone no longer necessarily represents an acceptable zone in which the center of gravity of the aircraft should be located in order to avoid unbalance, and a new acceptable zone might possibly be present within a second polygon defined by the thrust production units that remain in operation, depending on the number of such units. Under such circumstances, the avionics system uses at least one actuator to cause at least one heavy member to move so as to tend to move the position of the center of gravity of the aircraft into the new acceptable zone. Moving the center of gravity tends to enable an autopilot system to keep control of the aircraft in applications where a high level of availability and safety is required, possibly with an accompanying loss of performance.

The adjustment device may also include one or more of the following characteristics, taken singly or in combination.

In one aspect, the heavy member may include at least one electrical energy storage member.

The heavy member can be any member. Nevertheless, in the presence of one or more electrical energy storage members, and for example on an aircraft of the electric drone type, each electrical energy storage member presents considerable weight at high density, i.e. considerable weight occupying little space. It is therefore advantageous to use at least one electrical energy storage member as a heavy member that is movable for changing the position of the center of gravity.

By way of example, each electrical energy storage member may comprise one or more batteries.

Possibly, a plurality of distinct electrical energy storage members may be suitable for being moved singly and/or jointly as a function of the location of each thrust production unit that has failed.

In one aspect, said actuator may include at least one jack for moving at least one heavy member in translation along at least one axis. A jack may exert a force on a heavy member directly, or it may exert a force on a support that is secured to a heavy member.

Each heavy member may be moved directly or indirectly by at least one jack.

The term "member may be moved directly or indirectly by at least one jack" means that a jack may act on the heavy member itself or on a member connected to the heavy member.

For example, a possibly linear first jack may be connected to at least one heavy member in order to move the heavy member parallel to at least one roll axis of the aircraft. Furthermore, an optionally linear second jack may be connected to the assembly comprising the first jack and the heavy member in order to move the heavy member and the first jack parallel to a pitching axis of the aircraft.

Nevertheless, each jack may serve to move a heavy member along an arbitrary axis determined as a function of the number of thrust production units and of their positions. Depending on the characteristics of the aircraft, it is possible to envisage moving along a single axis using a single jack, providing such a movement is sufficient to keep the center of gravity of the aircraft in an acceptable zone.

In one aspect, said actuator may be designed to move a heavy member very quickly so as to avoid being subjected to a lengthy transient period during which the aircraft runs the risk of being unbalanced.

In one aspect, at least one thrust production unit may be a multisystem unit having at least two thrust production systems. For example, a thrust production unit may comprise two rotors driven in rotation by a single motor of the thrust production unit, or else each rotor may be rotated by its own dedicated motor.

Under such circumstances, depending on the speed of the actuator, at least one heavy member may be moved when one or all of the thrust production systems of a multisystem thrust production unit have failed, i.e. have stopped or are operating in degraded manner, for example. For example, in the presence of an actuator that is very fast, a heavy member needs to be moved only when all of the thrust production systems of a multisystem thrust production unit have failed. In another example, in the presence of an actuator that is not so fast, a heavy member may be caused to move as soon as any one of the thrust production systems of a multisystem thrust production unit has failed.

In one aspect, an actuator may comprise at least one resilient member and a blocker, the blocker being controlled by the avionics system to act directly or indirectly to prevent said resilient member from moving in the absence of a said failure of at least one thrust production unit. The resilient member may be a member that stretches or that retracts on being released by the blocker.

The term "to act directly or indirectly to prevent said resilient member from moving" means that the blocker may act on the resilient member or on the heavy member or on some other member connected to the heavy member and/or to the resilient member, for example.

Thus, such a resilient actuator may comprise a resilient member of the spring type. In the absence of a failure, the spring or the heavy member may be blocked by a finger. If a failure is detected, the finger is moved in order to release the spring. For example, an electromagnet or a pyrotechnic system may be used for moving the finger quickly. Said actuator may be designed to move a heavy member very quickly so as to avoid being subjected to a lengthy transient period during which the aircraft runs the risk of being unbalanced.

In one aspect, a heavy member may slide along a slideway, the slideway possibly including abutments for safety purposes.

In an embodiment, the adjustment device may include a respective heavy member fastened in the proximity of each thrust production unit.

Thus, the adjustment device may have at least as many heavy members as there are thrust production units. In the absence of a failure, at least one heavy member is arranged in the proximity of an associated thrust production unit. The term "associated" refers to the thrust production unit situated in the proximity of a particular heavy member, and vice versa. The term "in the proximity of" means that a particular heavy member is closer to the thrust production unit associated therewith than it is to the other thrust production units.

For example, an aircraft may comprise a central body, with each thrust production unit being connected to the central body by a fastener structure or the equivalent. Under such circumstances, and by way of example, each heavy member may be carried by a fastener structure connected to the associated thrust production unit in order to be located in the proximity of that thrust production unit.

In a first alternative, each heavy member may be carried by a slide that is movable in translation, the adjustment device having a respective said actuator for each slide, each said actuator being connected to a slide in order to move that slide in translation.

For example, the slide and the heavy member secured to the slide move towards a geometrical center of the aircraft in the event of the associated thrust production unit failing, or they are moved away from the geometrical center in the event of a failure of the thrust production unit that is arranged opposite from the associated thrust production unit.

For example, the adjustment device includes a respective heavy member fastened in the proximity of each thrust production unit, each heavy member being carried by a slide that is movable in translation, said adjustment device including a respective said actuator for each slide, said actuator being connected to a slide to move said slide in translation.

In a second alternative, an adjustment device may include a respective heavy member for each thrust production unit, each heavy member being secured to a movable link connected to said airframe, said adjustment device being provided with a respective said actuator configured to attach each heavy member to the airframe in the event of a said failure of at least one thrust production unit.

By way of example, each link may be in the form of a cord or the equivalent. A link may also be in the form of an arm that is movable in rotation relative to the airframe under the effect of gravity, and for example it may be in the form of a connection arm hinged to the airframe by a pivot or ball-joint type connection in the proximity of the geometrical center of the aircraft. The actuator is a securing device that is different from the link and that secures the heavy member to the airframe in the absence of a failure. Such a system may be designed to move a heavy member very quickly so as to avoid being subjected to a lengthy transient period during which the aircraft runs the risk of being unbalanced.

Thus, in normal operation, the heavy member is fastened by an actuator to the airframe of the aircraft in the proximity of a thrust production unit, which thrust production unit is offset away from the geometrical center of the aircraft. In a failure mode during which a particular thrust production unit has failed, the actuator releases the associated heavy member and the heavy member then moves, e.g. by gravity, so as to be substantially in register with the geometrical center of the aircraft under guidance from the link.

In a first variant of the second alternative, said actuator may include both a ring in said any member and also a jack, the jack having a rod that is movable in translation, with said rod penetrating into said ring in the absence of a said failure of at least one thrust production unit.

In the presence of a failure, the jack is activated to disengage the rod from the ring, thereby enabling the heavy member to be released, potentially very quickly.

In a second variant of the second alternative, said actuator may comprise a motor-driven clamp.

In the absence of a failure, the clamp is closed so as to clamp onto the heavy member or onto a support of the heavy member. In the presence of a failure, the clamp opens in order to release the heavy member, potentially very quickly.

In a third variant of the second alternative, said actuator may comprise at least one pyrotechnic device configured to link said heavy member to said airframe in the absence of a said failure of at least one thrust production unit.

A pyrotechnic device, such as explosive bolts, may also be used for separating the heavy member quickly from its support.

The various above-described variants may be combined, with a single heavy member being held by actuators of different technologies.

Furthermore, the link may be suitable for being jettisoned.

If necessary, the link and the heavy member carried by the link may be jettisoned in an appropriate location immediately prior to landing. In particular, jettisoning is all the more possible when the heavy member comprises a battery for electrically powering only the thrust production unit that has failed.

For example, an electric jettisoning motor, an electromagnet, or a pyrotechnic member may be linked to a connection pin connecting the link to a body of the aircraft. Prior to landing, the pin is disengaged from the connection in order to jettison the link.

In addition, or as an alternative, the link may comprise a foldable arm.

In addition, or as an alternative, the aircraft may land on a docking station that includes an orifice suitable for receiving the heavy member that is hanging down as a result of a failure.

In addition, or as an alternative, the aircraft may include landing gear that is tall enough to avoid any interference while landing.

The invention also provides an aircraft having an airframe, said airframe carrying at least two thrust production units that contribute at least to providing the aircraft with lift or indeed with propulsion, the aircraft including an adjustment device of the invention.

The invention also provides a method of stabilizing an aircraft, said aircraft having at least two thrust production units, each contributing at least to providing the aircraft with lift or indeed with propulsion. The method comprises the following steps: detecting a failure of a thrust production unit; and as a result of detecting a failure of a thrust production unit, causing a movement of a heavy member to move from a current position to an emergency position in order to modify the position of the center of gravity of the aircraft, e.g. in order to re-center the center of gravity in a zone that is predefined as a function of the thrust production units that are still in nominal operation.

The method may include one or more of the following characteristics, taken singly or in combination.

In particular, each thrust production unit may comprise two rotor systems, each rotor system comprising both a motor and a rotor provided with a plurality of blades, and detecting a failure of a thrust production unit may include a step of detecting a failure of either one of the two rotor systems.

If a heavy member can be moved quickly enough, then a heavy member need be moved only in the presence of a complete failure of a thrust production unit. The transient situation of instability associated with an inappropriate center of gravity will be short and can be managed by the avionics system.

Nevertheless, if a thrust production unit comprises a plurality of different thrust production systems, the operation of moving a heavy member may be anticipated and may take place as soon as any one of the thrust production systems becomes defective.

In one aspect, the emergency position is a stored position that depends on the thrust production unit that has failed, or indeed on the thrust production system that has failed.

The emergency position that is to be reached may be a predetermined position that depends on the thrust production unit that has failed. For example, for each possible failure configuration, an emergency position may be determined by testing, by calculation, and/or by simulation. For example, on an aircraft having four thrust production units, the avionics system may store four emergency positions, each associated with a different one of the thrust production units failing.

In the presence of a failure of a thrust production unit, and given the particular situation that has been encountered, the avionics system can then select the appropriate position for each heavy member from a list of predetermined positions, each predetermined position being a position that is to be reached by the heavy member in the event of a failure of one or more particular thrust production units.

Optionally, and in the presence of a plurality of movable heavy members, and for each failure configuration, the avionics system may store, e.g. in a memory, at least one emergency position to be reached and the heavy member(s) to be moved.

In addition, or as an alternative, said method may include a step of calculating with the avionic system the emergency position that is to be reached as a function of a stored model, while taking into consideration at least the thrust production unit that has failed.

For example, said stored model also takes into consideration at least the weight of a payload on board the aircraft and/or the airspeed or the equivalent of the aircraft.

The stored emergency position the may be replaced by a position calculated by the avionics system of the aircraft.

Furthermore, a respective heavy member may be fastened in the proximity of each thrust production unit, said movement comprising a step of causing the heavy member situated in the proximity of the thrust production unit that has been detected as failing to move towards a geometrical center of the aircraft, or a step of causing the heavy member that is situated in the proximity of a thrust production unit that is arranged opposite from the thrust production unit that has been detected as failing to move away from said geometrical center.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
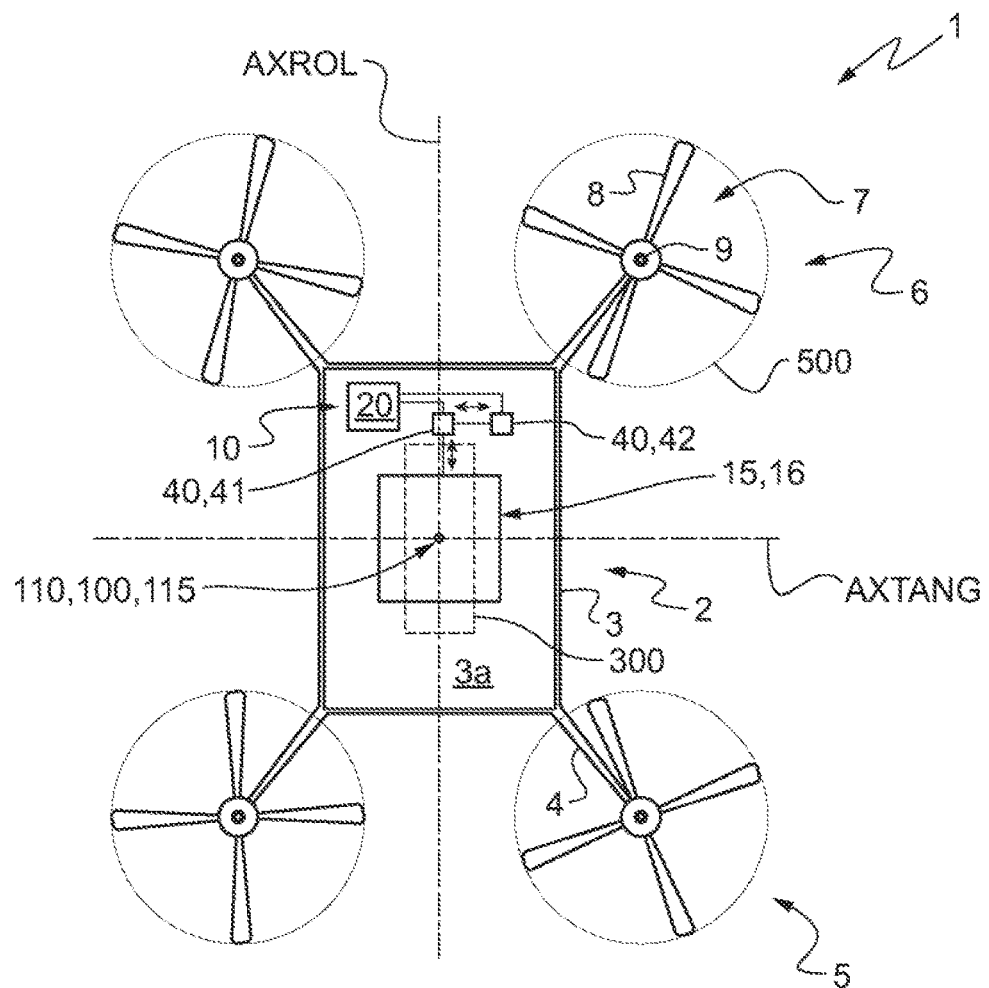
FIG. 1 is a diagram showing an aircraft of the invention having thrust production units in operation.

FIG. 1 shows an aircraft 1 provided with an adjustment device 10 of the invention. FIG. 1 shows a drone type aircraft 1, and by way of illustration a multirotor drone. Nevertheless, and by way of example, the aircraft 1 could be an aircraft having at least one on-board pilot and/or an airplane and/or a rotorcraft and/or an aircraft suitable for vertical takeoff and landing (VTOL).

Independently of this aspect, the aircraft 1 has an airframe 2. The airframe 2 comprises a body 3 that may be referred to, for convenience, as a "central" body. The body 3 extends longitudinally from rear to front parallel to a roll axis AXROL of the aircraft 1 and transversely parallel to a pitching axis AXTANG of the aircraft 1. The body 3 may define one or more internal volumes 3a. Each internal volume 3a may be adapted to transport passengers, such that the aircraft 1 as a whole may be adapted for transporting passengers. If so desired, the internal volume 3a may be adapted to receive at least a portion of the electrical and operating equipment of the aircraft 1.

Furthermore, the aircraft 1 may have an arbitrary number of thrust production units 5, there being at least two of them. By way of example, and as shown in FIG. 1, the aircraft 1 may have four thrust production units. Each thrust production unit 5 exert thrust that contributes to providing the aircraft 1 with lift and possibly also with propulsion in any direction, downwards, upwards, forwards, rearwards, or sideways.

Each thrust production unit 5 is connected to the body 3 of the airplane 2 by at least one structural support 4. Each thrust production unit 5 is then attached to a corresponding structural support 4, with the structural support 4 being attached to the body 3. Such a structural support 4 may be in the form of an optionally hollow arm. For example, for an aircraft that has four thrust production units 5, the body 3 and the structural supports may form a structure that is H- or X-shaped.

Furthermore, each thrust production unit 5 may comprise at least one rotor system 6, with the aircraft 1 being a multirotor aircraft. It is possible to envisage other thrust production units. In an example, each thrust production unit 5 may comprise a plurality of thrust production systems, and for example such a unit may comprise two rotor systems 6. Each rotor system 6 may comprise both a motor 9, e.g. an electric motor, and also a rotor 7 having blades 8. In an embodiment, each motor 9 of a thrust production unit 5 may be carried by a respective structural support 4, the blades 8 being carried by a motor 9 via a hub or the equivalent.

Also, each thrust production unit 5 may include a fairing 500 that is carried by the body 3 and/or by a structural support 4.

Furthermore, the aircraft 1 may be controlled by varying the pitch of the blades 8 of at least one rotor system 6, or by varying the speed of rotation of said blades 8, or by a combination of varying both pitch and speed of rotation.

In another aspect, the aircraft 1 includes an adjustment device 10 for adjusting the position of the center of gravity 100 of the aircraft 1 as a function of the state of operation of each thrust production unit 5.

The adjustment device 10 is provided with at least one member referred to as a "heavy" member 15 in order to distinguish it from the other members of the device. Each heavy member 15 of the adjustment device 10 is movable in the reference frame of the aircraft 1. Thus, by way of example, each heavy member 15 may be carried by the body 3, by a structural support 4, or indeed by a thrust production unit 5 in the absence of a failure.

At least one heavy member 15 may comprise an electrical energy storage member 16. For example, the aircraft 1 may have a respective electrical energy storage member 16 for each thrust production unit 5 or indeed for each thrust production system, and where appropriate for each rotor system 6, with one, or more, or all of the electrical energy storage members 16 being movable relative to the airframe.

At least one heavy member 15 may be made to be movable directly and/or it may be carried by a support that is itself movable in the reference frame of the aircraft. Under all circumstances, the heavy member 15 is made to be movable in the reference frame of the aircraft 1, being capable of reaching at least two distinct positions, thereby causing the center of gravity 100 of the aircraft 1 take up two different positions in this reference frame of the aircraft 1.

Movement of at least one heavy member 15, and consequently of the center of gravity 100 of the aircraft 1, is caused to be dependent on the operation of the thrust production units 5.

Under such circumstances, the adjustment device 10 includes an avionics system 20 that is configured to detect a failure leading to a change in the thrust generated by at least one thrust production unit 5. Furthermore, the avionics system 20 is connected to at least one actuator 40, and it is configured to control at least one actuator 40 so as to cause at least one heavy member 15 to move in the presence of such a failure, either by moving the heavy member 15 directly, or else by moving a member that is secured thereto, for example.

Figure 2:
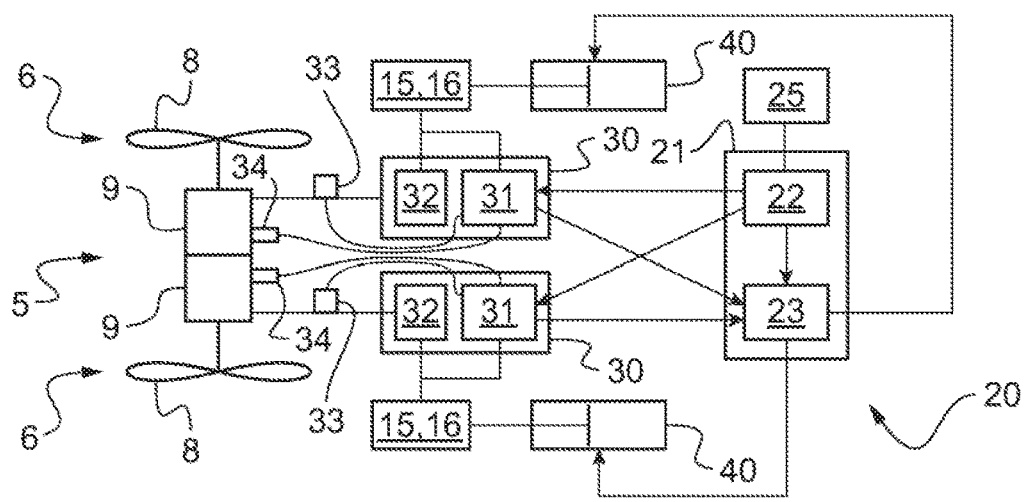
FIG. 2 is a diagram showing an example of a thrust production unit.

FIG. 2 shows an example of an avionics system 20. Such an avionics system 20 may comprise one or more calculation means, e.g. using conventional methods for detecting the failure of a thrust production unit 5, and where applicable for causing one or more actuators 40 to operate. The term "calculation means" should be interpreted broadly, and by way of example, calculation means may comprise at least one processor with at least one memory, at least one integrated circuit, at least one programmable system, at least one logic circuit, these examples not limiting the scope to be given to the term "calculation means".

In the architecture example of FIG. 2, each thrust production unit 5 may comprise at least one rotor system 6, and for example it may comprise two rotor systems 6, each provided with a respective electric motor 9.

Optionally, the avionics system 20 includes flight control calculation means 22 that determine a control setpoint for each motor 9 and/or for systems for modifying the pitch of the blades in order to follow a path. The path may be stored in memory or it may be established in flight by various means. Each control setpoint may be established by a subassembly referred to for convenience as "flight control" calculation means 22, which subassembly takes account of flight data coming from conventional flight sensors 25. For example, the control setpoints may be in the form of setpoints for the speeds of rotation of the electric motors 9 of the thrust production units 5 or in the form of pitch setpoints for the blades 8 of the thrust production units 5. The control setpoints may be determined in conventional manner.

Each control setpoint is optionally transmitted by the flight control calculation means 22 to regulation electronics 30 serving to servocontrol one or more motors 9 of the thrust production units 5 and/or to a device for modifying the pitch of the blades. For example, the servocontrol may be performed by servocontrol calculation means 31 using a plurality of regulation loops as a function of measurements coming from movement sensors 34 serving to measure a position or a speed or an acceleration and installed on the motors 9, together with sensors 33 for measuring the electricity consumed by each electric motor 9. The movement sensors 34 and the electricity measuring sensors 33 are connected to the servocontrol calculation means 31. The movement sensors 34 may be of various kinds: a Hall effect sensor, a sin-cos sensor, a "resolver", an encoder, a tachometer, an accelerometer, etc . . . .

Furthermore, the regulation electronics 30 may include a respective power bridge 32 dedicated to each electric motor 9. The power bridges 32 and the servocontrol calculation means 31 are connected to an electricity storage member 16.

Each power bridge 32 is then controlled by the servocontrol calculation means 31 to allow the desired electricity to flow to each electric motor 9 in order to reach the initial control setpoint.

Under such circumstances, and by way of example, monitoring calculation means 23 may be integrated directly in the regulation electronics 30 or in calculation means 21 integrating the flight control calculation means 22 in the example shown in order to determine whether at least one of said thrust production units 5 has failed, i.e. in order to determine whether a thrust production unit 5 is not generating the appropriate thrust or whether a thrust production system of a thrust production unit is not generating the appropriate thrust. Where appropriate, the monitoring calculation means 23 may determine whether any one of the thrust production systems of a thrust production unit has failed.

For example, the monitoring calculation means 23 may signal that a motor has failed in the event of an electricity measuring sensor 33 measuring zero current, even though the servocontrol calculation means 31 have issued an order transmit electric current.

Alternatively, or in addition, the monitoring calculation means 23 may indicate that a motor has failed if the electric motor 9 presents a speed of rotation as determined by a movement sensor 34 that is decreasing relative to a theoretical expected speed as estimated by an on-board motor model. This measured speed of rotation may be estimated by taking the derivative of the position measured using a movement sensor 34 of the position sensor type, or else directly by a speed sensor such as a tachometer, or indeed by integrating an acceleration measured by a movement sensor 34 of the accelerometer type. The on-board motor model may be determined by testing, by calculation, or by simulation in order to supply a theoretical expected speed of rotation for the motor, e.g. as a function of physical characteristics of the electric motor 9 such as its inertia, its impedance (resistance, inductance, capacitance), its friction, its electrical constants, and/or as a function of the power supply voltage of the electric motor 9, of the current drawn by electric motor 9, of external forces, or of any other necessary parameter. If the difference between the measured speed of rotation and the expected speed is too great, and in particular is greater than a threshold, then the monitoring calculation means 23 deduce that the system has suffered a failure. Under such circumstances, the monitoring calculation means 23 order one or more actuators 40 to cause at least one heavy member 15 to move, and consequently move the center of gravity 100 of the aircraft 1.

The aircraft 1 may have a plurality of sensors and/or calculation means in order to construct failure information that is reliable. Command monitor architecture or voted architecture techniques can be used to guarantee the integrity of the processed information.

The monitoring calculation means 23 used for failure detection can also use their outputs to activate the actuators 40 directly. In order to avoid untimely activation of an actuator 40, the monitoring calculation means 23 may control one pole with its command channel for electrically powering a "+" terminal of an actuator, and may control another pole with its monitoring channel for electrically powering a "−" terminal of the actuator.

FIGS. 3 to 6 show the method of the invention.

Figure 3:
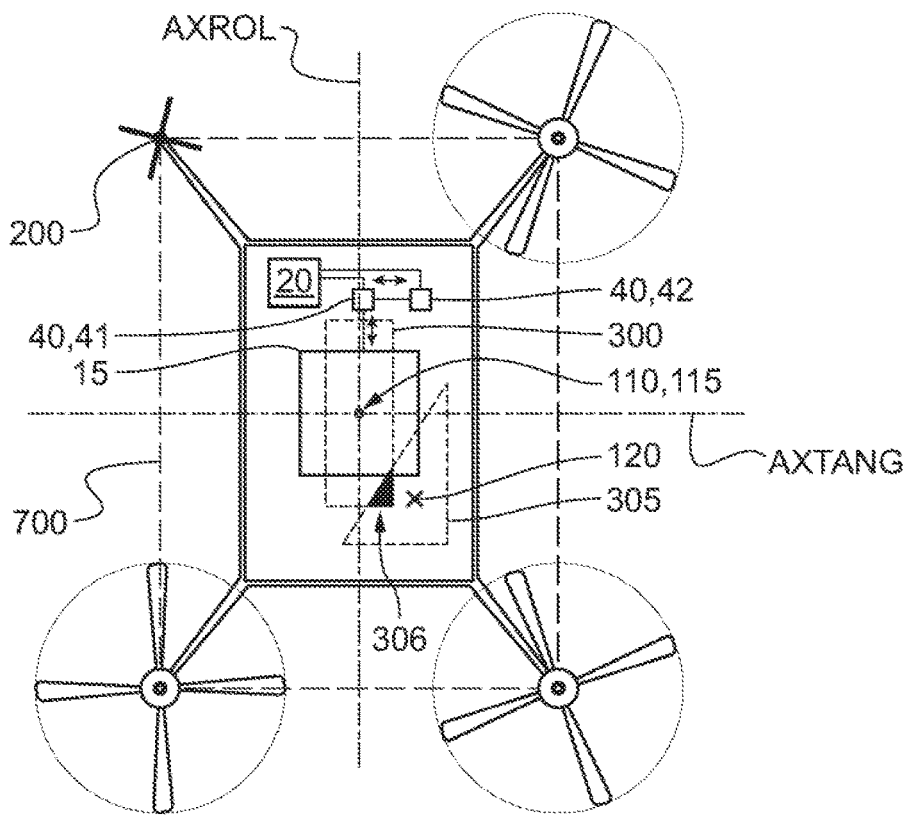
FIG. 3 is a diagram showing an aircraft of the invention the having a thrust production unit that has failed.

With reference to FIG. 3, in normal flight, all of the thrust production units 5 are operating correctly. The current position 115 of the center of gravity 100 of the aircraft is then in an initial acceptable zone 300 that is defined by a polygon 700 described by the thrust production units 5.

When a thrust production unit fails, which failure is illustrated by a cross 200, the position of the center of gravity 100 remains unchanged. In contrast, the center of gravity 100 is no longer located in the new acceptable zone 305, which is a function of the thrust production units that remain in nominal operation. The aircraft runs the risk of being unbalanced. It should be observed that there may be a zone 306 that is common both to the old acceptable zone 300 and to the new acceptable zone 305.

In the applied method, the avionics system 20 detects the failure of a thrust production unit.

Figure 4:
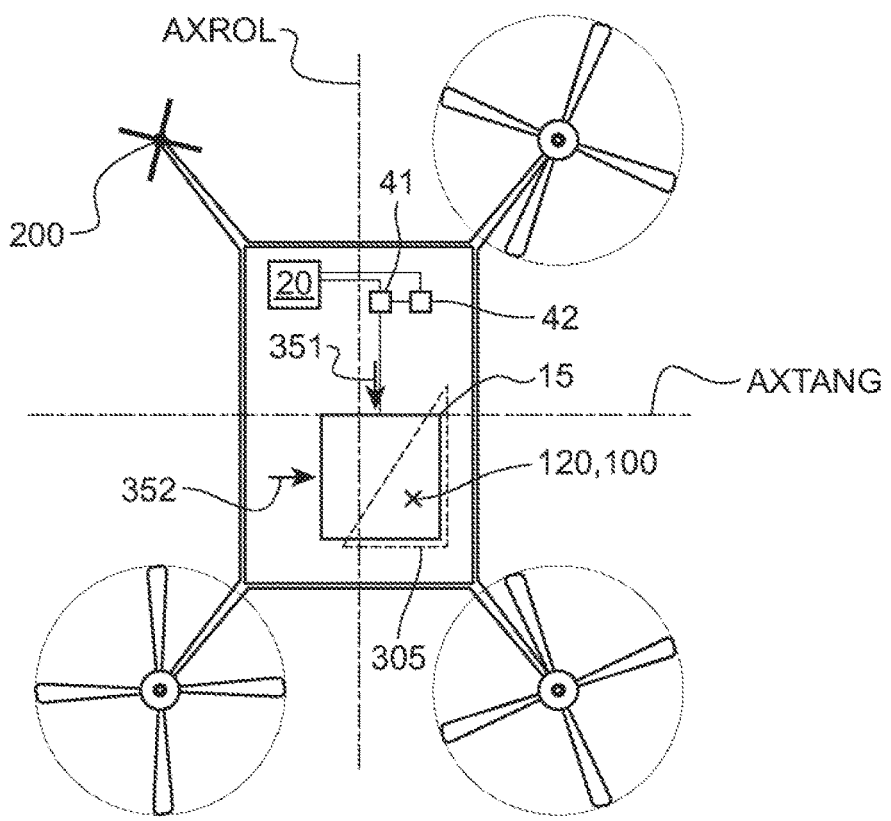
FIG. 4 is a diagram showing an aircraft of the invention and presenting a movement of a heavy member following the failure of a thrust production unit.

Under such circumstances, and with reference to FIG. 4, the avionics system 20 includes at least one heavy member 15 for placing the center of gravity 100 in an emergency position 120 that is located in the new acceptable zone 305.

For example, an actuator 40 may include at least one jack for moving at least one heavy member 15 in translation along at least one axis. In the example shown in FIG. 4, the avionics system causes a first jack 41 to lengthen along arrow 351 parallel to the roll axis AXROL, and causes a second actuator 42 to retract along arrow 352 parallel to the pitching axis AXTANG.

In the presence of a thrust production unit 5 having at least two thrust production systems, each exerting thrust, e.g. two rotor systems 6, at least one heavy member 15 may be moved as soon as any one of the thrust production systems fails, in order to bring the center of gravity 100 into the zone 306 that is common to the acceptable zone 300 and to the acceptable zone 305.

Furthermore, the emergency position 120 may be a position that is stored or that is calculated as a function of a stored model. By way of example, such a stored model may comprise at least one mathematical equation and/or at least one table. Such a stored model may determine the emergency position to be reached as a function at least of the thrust production unit 5 that has failed and/or as a function of the weight of a payload on board the aircraft 1 and/or as a function of the speed of advance of the aircraft 1.

Figure 5:
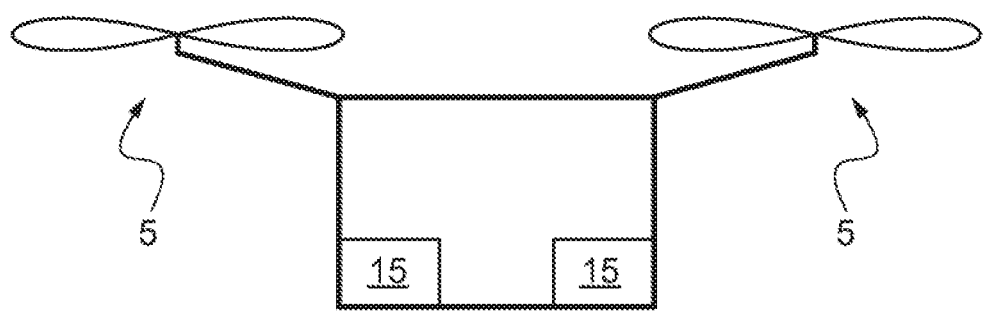
FIG. 5 is a diagram showing a heavy member located in the proximity of a thrust production unit.

Furthermore, and with reference to FIG. 5, at least one heavy member 15 may be fastened in the proximity of each thrust production unit 5.

Figure 6:
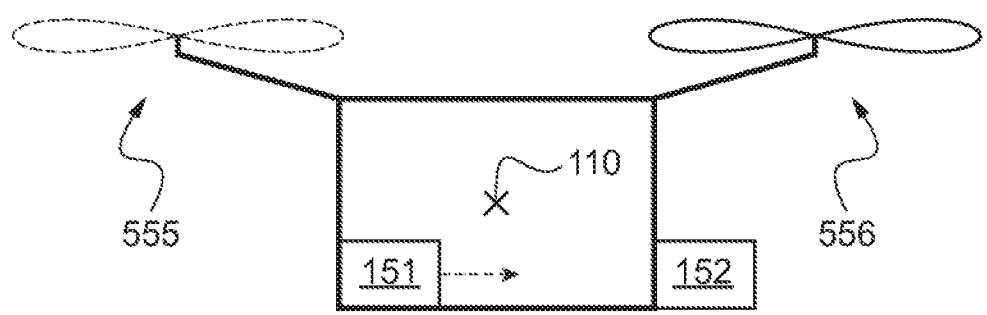
FIG. 6 is a diagram showing a heavy member that has moved to the outside of the aircraft.

With reference to FIG. 6, following the failure of a thrust production unit 555, the avionics system may cause the heavy member 152 situated in the proximity of the thrust production unit 556 that is opposite from the failed thrust production unit 555 to move away from the geometrical center 110 of the aircraft, which opposite thrust production unit 556 may, for example, be located substantially symmetrically relative to the failed thrust production unit 555 about the geometrical center 110. For example, a heavy member 152 is arranged on a slide that is movable in translation for this purpose.

As an alternative and/or in addition, the heavy member 151 situated in the proximity of the thrust production member 555 in which a failure has been detected may conversely be moved towards the geometrical center 110 of the aircraft 1.

An actuator may comprise an electric jack.

FIGS. 7 to 14 show various embodiments of actuators.

Figure 7:
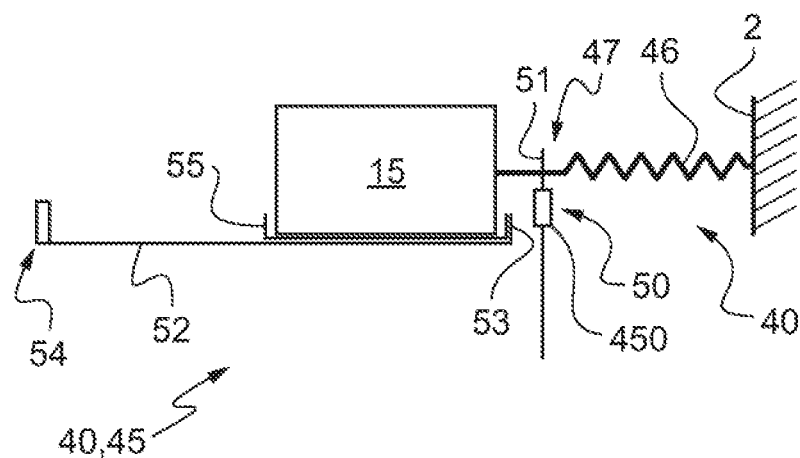
FIG. 7 is a diagram showing an actuator moving a heavy member in translation, the actuator being provided with a blocker and with a resilient member.

FIG. 7 shows an actuator 40 that is suitable for moving a heavy member 15 in translation, with a respective heavy member 15 optionally being fastened in the proximity of each thrust production unit 5. This actuator 40 is an actuator of variable length that comprises at least one resilient member 46 and a blocker 50. For example, the resilient member 46 comprises a spring that extends from a first end of the spring that is carried by the airframe 2 to a second end of the spring. The second end of the spring is connected by a connection member 47 to a heavy member 15 or to a slide 55 carrying the heavy member 15.

Figure 8:
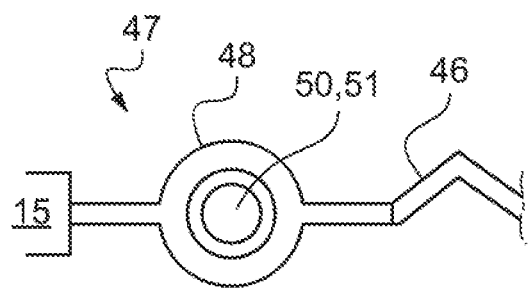
FIG. 8 is a diagram showing such a blocker of a FIG. 7 actuator.

Under such circumstances, and with reference to FIG. 8, the blocker 50 may comprise a finger 51 that is movable in translation to move into and out from a ring 48 of the connection member 47. In other alternatives, the blocker 50 may co-operate with the slide 55 or with the heavy member 15 or with the resilient member 46. The finger 51 may be controlled by a jack 450, which may be electrical by way of non-exclusive example, or indeed it may be an electromagnet, for example.

Figure 9:
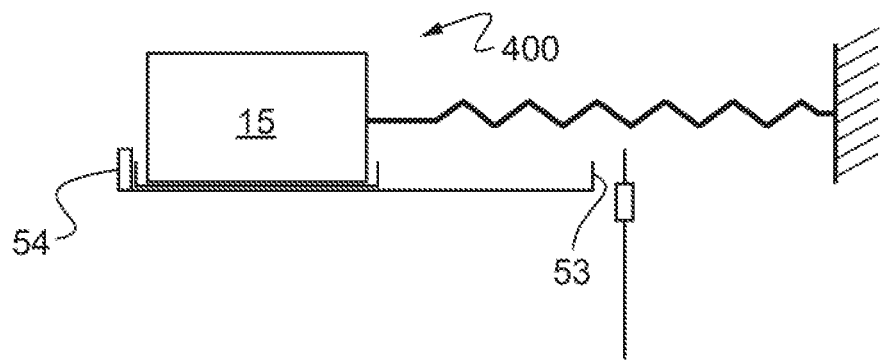
FIG. 9 is a diagram showing the movement of a heavy member under drive from an actuator of FIG. 7.

By default, the resilient member may be compressed. With reference to FIG. 9, in the presence of a failure, the finger 51 is disengaged from the ring 48. Under such circumstances, the resilient member 46 relaxes and pushes the heavy member 15 along arrow 400. The inverse configuration is also possible, with the resilient member being stretched by default and retracting as a result of the finger 51 being disengaged.

Optionally, the heavy member 15, or a slide 55 carrying the heavy member 15, moves along a slideway 52, which slideway 52 may have two abutments 53 and 54 between which the heavy member 15 or the slide 55 moves.

Figure 10:
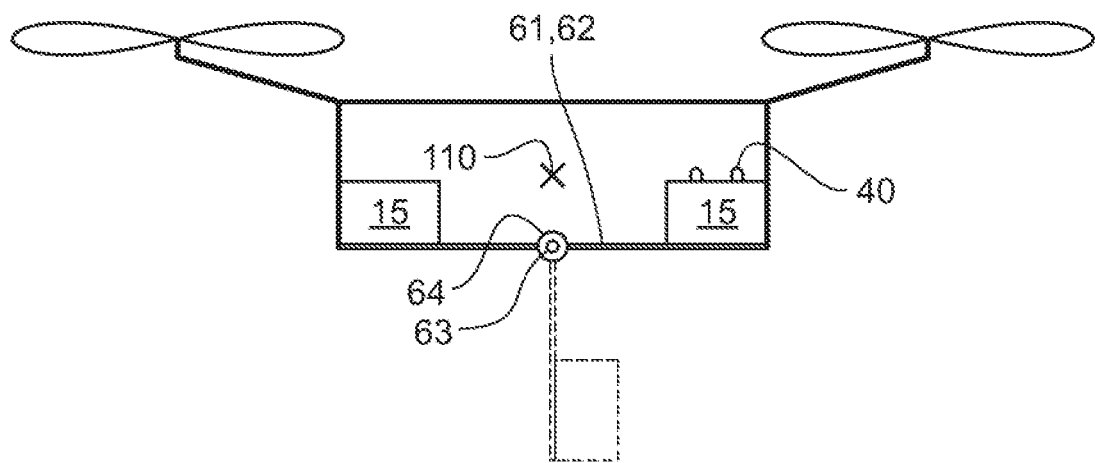
FIG. 10 is a diagram showing a heavy member secured to a movable link.

FIG. 10 shows an adjustment device 10 including a respective heavy member 15 that is optionally fastened in the proximity of each thrust production unit 5.

Each heavy member 15 is secured to a link 61 that is movable in the reference frame of the aircraft 1. This link 61 may be of various kinds, and by way of example it may be connected to the airframe 2 in the proximity of its geometrical center 110.

By way of example, the link 61 may comprise a connection arm 62 that is hinged to the airframe 2. For example, the connection arm 62 may be hinged to the airframe 2 via a pivot type connection or via a ball-joint type connection. Optionally, the connection arm 62 includes a clevis or a ball-joint ball having a pin 63 passing therethrough, the pin 63 being carried by an element 64 of the airframe 2. Optionally, a motor, an electromagnet, or the equivalent may enable the pin 63 to move in translation so as to be able to disengage the pin 63 from the connection arm 62, thus enabling the link 61 to be jettisoned.

In normal operation, the heavy member 15 carried by the link 61 is attached to the airframe 2 by an actuator 40. In the event of a failure, the actuator 40 releases the heavy member 15, which moves under gravity, being guided by the link 61.

In FIG. 10, the actuator 40 comprises an electromagnet.

Figure 11:
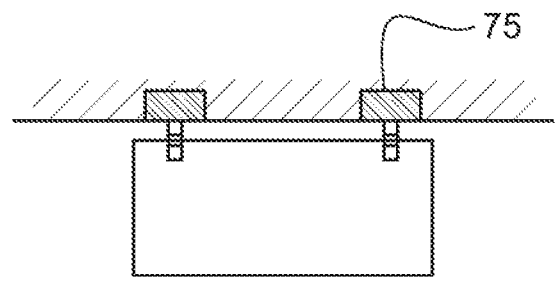
FIG. 11 is a diagram showing a pyrotechnic actuator.

In FIG. 11, the actuator 40 includes at least one pyrotechnic device 75, and in particular two explosive bolts in the example shown.

Figure 12:
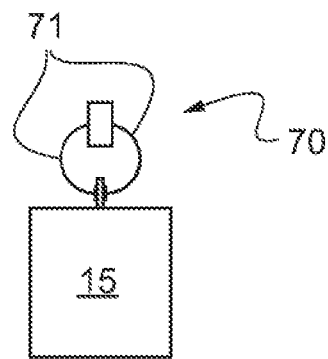
FIG. 12 is a diagram showing an actuator having a closed camp.
Figure 13:
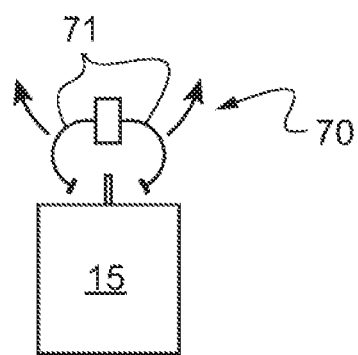
FIG. 13 is a diagram showing the FIG. 12 actuator with the clamp open.

In FIG. 12, the actuator 40 comprises a clamp 70 driven by an electric motor. The clamp 70 has two branches 71 clamping onto a portion of the heavy member 15 or of a support secured to the heavy member 15, as shown in FIG. 12, the clamp 70 being shown open in FIG. 13.

Figure 14:
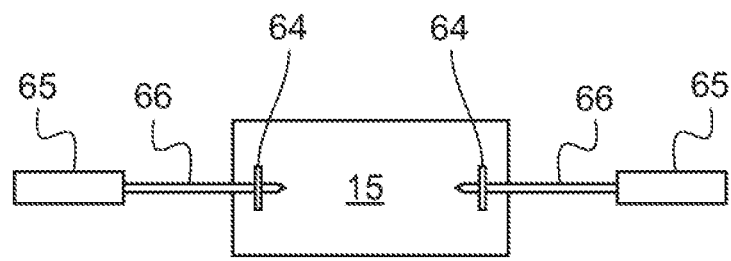
FIG. 14 is a diagram showing an actuator comprising a jack and a ring.
Figure 15:
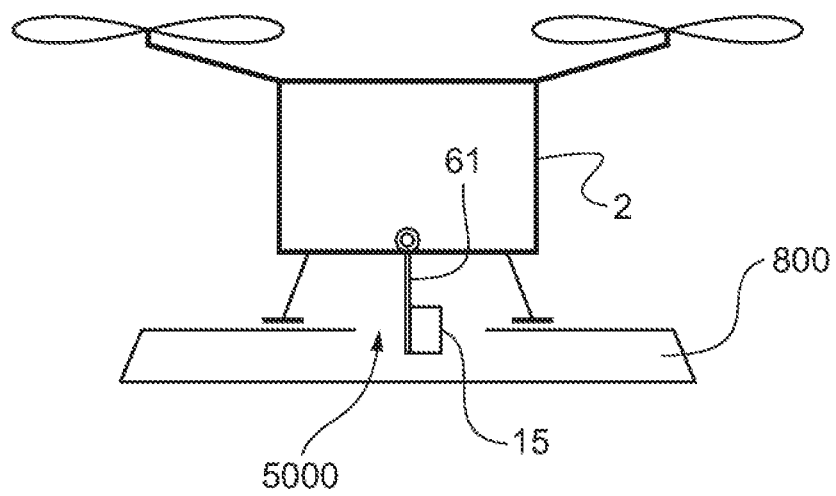
FIG. 15 is a diagram showing an aircraft standing on a hollow docking station.

In FIG. 14, an actuator 40 may include a ring 67 that is secured to a heavy member 15 or to a support of the heavy member 15, together with a jack 65, which by way of non-exclusive example may be an electric jack. The jack 65 is provided with a rod 66 that is movable in translation, the rod 66 being engaged in the ring 67 in the absence of any failure. In the example shown, two actuators 40 are used. Furthermore, and with reference to FIG. 15, the link 61 may be located beneath the airframe 2 following a failure. The link 61 may be jettisoned in flight in order to avoid interfering with the ground or with a docking station 800 while landing.

Optionally, such a docking station 800 may also include a setback 5000 for avoiding any such interference.

Naturally, the present invention may be subjected to numerous variations as to its implementation. Although several embodiments are described above, it should readily be understood that it is not conceivable to identify all possible embodiments exhaustively. It is naturally possible to envisage replacing any of the means described by equivalent means without going beyond the ambit of the present invention.

What is claimed is:

1. An adjustment device for adjusting the position of the center of gravity of an aircraft, the aircraft having at least two thrust production units that contribute at least to providing the aircraft with lift, the adjustment device comprising at least one heavy member that is movable relative to an airframe of the aircraft, the adjustment device comprising at least one actuator for causing the heavy member to move; the at least one actuator controlled to move the heavy member in the presence of a failure of at least one thrust production unit,
   wherein the adjustment device includes an avionics system configured to detect the failure of any one of the thrust production units and, in the presence of the failure of at least one thrust production unit, to control the at least one actuator to cause the heavy member to move, the at least one actuator comprising at least one resilient member and a blocker, the blocker controlled by the avionics system to act directly or indirectly to prevent the resilient member from moving in the absence of the failure of at least one thrust production unit.

2. The adjustment device according to claim 1; wherein the heavy member includes at least one electrical energy storage member.

3. The adjustment device according to claim 1;
   wherein the adjustment device includes a respective heavy member fastened in proximity to each thrust production unit, each heavy member carried by a slide that is movable in translation, the adjustment device including a respective said actuator for each slide, the actuator connected to a slide to move the slide in translation.

4. An aircraft having an airframe, the airframe carrying at least two thrust production units that contribute at least to providing the aircraft with lift;
   wherein the aircraft includes an adjustment device for adjusting the position of the center of gravity of the aircraft, the adjustment device comprising at least one heavy member that is movable relative to the airframe of the aircraft, the adjustment device comprising at least one actuator for causing the heavy member to move; the at least one actuator controlled to move the heavy member in the presence of a failure of at least one thrust production unit,
   wherein the adjustment device includes an avionics system configured to detect the failure of any one of the thrust production units and, in the presence of the failure of at least one thrust production unit, to control the at least one actuator to cause the heavy member to move, the at least one actuator comprising at least one resilient member and a blocker, the blocker controlled by the avionics system to act directly or indirectly to prevent the resilient member from moving in the absence of the failure of at least one thrust production unit.

5. A method of stabilizing the aircraft according to claim 4, the aircraft having at least two thrust production units, each thrust production unit contributing at least to providing the aircraft with lift;
   wherein the method comprises the following steps:
   detecting by using the avionics system the failure of a thrust production unit; and
   as a result of detecting the failure of a thrust production unit, movement by using the at least one actuator under the control of a heavy member to move from a current position to an emergency position in order to modify the position of the center of gravity of the aircraft.

6. The method according to claim 5; wherein each thrust production unit comprises two rotor systems, each rotor system comprising both a rotor and also a rotor provided with a plurality of blades, and wherein detecting the failure of a thrust production unit includes a step of detecting the failure of either one of the two rotor systems.

7. The method according to claim 5; wherein the emergency position is a stored position depending on the thrust production unit that has failed.

8. The method according to claim 5; wherein the method includes a step of calculating with the avionics system the emergency position as a function of a stored model while taking into consideration at least the thrust production unit that has failed.

9. The method according to claim 8; wherein the stored model takes into consideration at least the weight of a payload on board the aircraft or the speed of advance of the aircraft.

10. The method according to claim 5; wherein a respective heavy member is fastened in proximity to each thrust production unit, the movement comprising a step of causing the heavy member situated in proximity to the thrust production unit that has been detected as failing to move towards a center of the aircraft, or a step of causing the heavy member that is situated in proximity to a thrust production unit opposite from the thrust production unit that has been detected as failing to move away from the center.

11. An adjustment device for adjusting the position of the center of gravity of an aircraft having at least two thrust production units that contribute at least to providing the aircraft with lift, the adjustment device comprising at least one heavy member movable relative to an airframe of the aircraft, the adjustment device comprising an actuator capable of causing the heavy member to move upon a failure of at least one thrust production unit, the adjustment device including an avionics system configured to detect the failure of any one of the thrust production units and, upon the failure of at least one of the thrust production units, to control the actuator to cause the heavy member to move, the actuator comprising a resilient member and a blocker, the blocker controllable by the avionics system to prevent the resilient member from moving in the absence of the failure of at least one thrust production unit.

12. The adjustment device according to claim 11; wherein the heavy member includes an electrical energy storage member.

13. The adjustment device according to claim 11; wherein the adjustment device includes a respective heavy member fastened in proximity to each of the thrust production units.

14. The adjustment device according to claim 11; wherein each of the heavy members is carried by a slide movable in translation.

15. The adjustment device according to claim 14; wherein the adjustment device including a respective actuator connected to one of the slides to move each of the respective one of the slides in translation.

* * * * *